J. Johnson,
Coffee Cleaner.
No. 113,890. Patented Apr. 18, 1871.

Witnesses:
V. C. Clayton
F. G. Clayton

Inventor:
Josee Johnson

United States Patent Office.

JOSEE JOHNSON, OF NEW YORK, N. Y.

Letters Patent No. 113,890, dated April 18, 1871.

IMPROVEMENT IN APPARATUS FOR CLEANING COFFEE, &c.

The Schedule referred to in these Letters Patent and making part of the same.

*To all whom it may concern:*

Be it known that I, JOSEE JOHNSON, of New York city, in the county of New York and in the State of New York, have invented certain new and useful "Improvements in Apparatus for Cleaning Coffee, Grain, &c.;" and I do hereby declare that the following is a full, clear, and exact description thereof, reference being had to the accompanying drawing and to the letters of reference marked thereon.

The nature of my invention consists in an apparatus and process for cleaning green coffee, grain, &c., of gravel, stone, dust, &c., by means of a conical, wedge, or similar-shaped vessel or sieve made of perforated sheet metal, wire-netting, or wire-gauze, provided with a vessel or sieve of the same shape and material, but of a much smaller size, which is to fit within and on the bottom of the larger vessel or sieve, the smaller vessel designed to receive the gravel, &c., which is washed from the coffee or grain, and the larger vessel to hold the coffee or grain, each vessel to be provided with handles or other suitable means for lifting or moving them in and out of the water, or as desired, all of which will be more fully hereinafter described to enable others skilled in the arts to make and use my invention.

In the drawing—

A is the larger vessel or sieve, preferably made of a conical form, and when the cleaning is not to be carried on on a large scale the vessel A may be of a size to conveniently contain about a bag of coffee or a hundred pounds of coffee; and then the vessel A may have handles, by means of which the operator may lift and manage the vessel as desired. If the intention is to clean large amounts of coffee the vessel A may be constructed of a much larger size, and provided with means of attachment to steam or other power, so that a larger and heavier quantity of grain or coffee could be rapidly and easily cleaned.

B is the smaller vessel, and is made to correspond with the shape of the vessel A. It is provided with a handle, $b$, by means of which it (B) can be readily lifted out of the vessel A. The size of this vessel B will be of about the size necessary to hold the gravel, dirt, &c., which may be washed from the amount of coffee contained by the vessel A in one washing.

Figure 3:
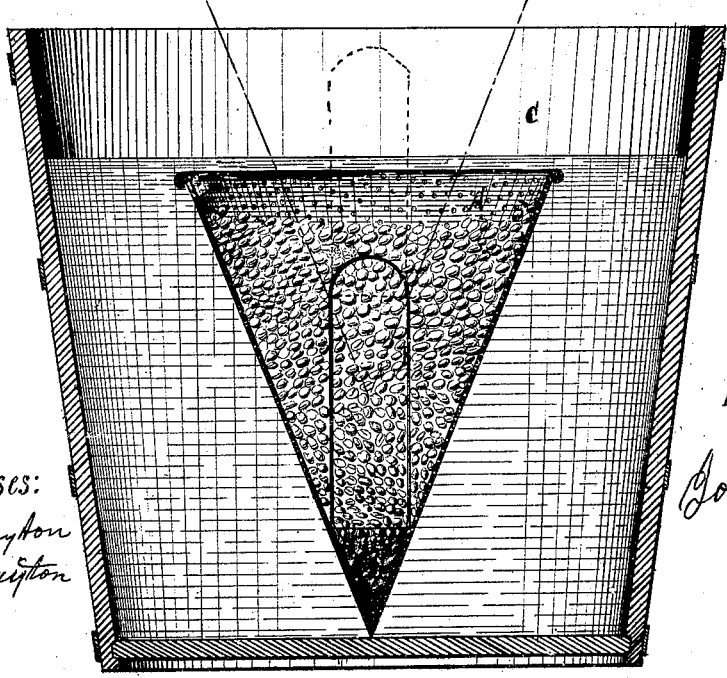
Figure 3 represents the two vessels of conical form made of perforated sheet metal, the coffee washed, and the gravel, dirt, &c., precipitated into the smaller vessel ready to be removed; and the two vessels or sieves are shown immersed in a tub of water.

A tub or barrel, C, of a size sufficient to receive the vessel or sieve A, is about filled with water, as shown in fig. 3.

Figure 1:
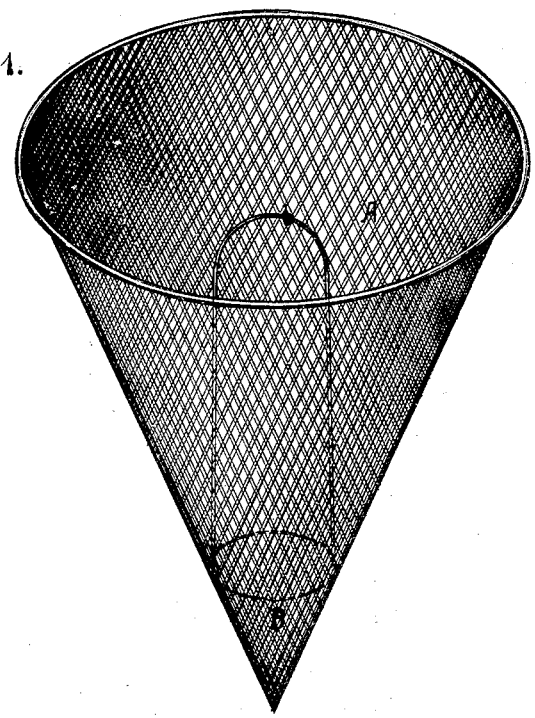
Figure 1 represents the larger vessel or sieve constructed of wire-netting, with the smaller vessel or sieve of the same material, and with a handle, and both of a conical shape.
Figure 2:
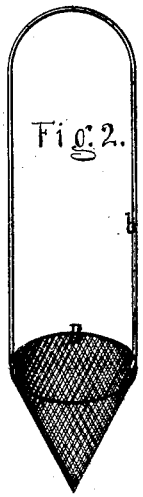
Figure 2 shows the smaller vessel or sieve shown in fig. 1 by itself.

Having constructed the vessels or sieves A and B as above set forth, and put them together as shown in fig. 1, they are placed in a tub of water, C, as shown in fig. 3. The coffee or grain to be cleansed is then poured into the mouth of vessel A. The gravel, dirt, &c., being of a greater specific gravity than the coffee, will fall through the water more rapidly than the coffee, and so accumulate in the smaller vessel or sieve B, with the coffee above it and outside of the the vessel B; but as some of the gravel, &c., poured in with the last of the coffee to be washed would not be precipitated so rapidly as to reach the vessel B before the coffee first poured in, the operator, by handles or proper lifting apparatus, lifts the larger vessel A up, as shown in dotted lines in fig. 3, and then lets the vessel down into the water rapidly; the force of the water passing through the openings in the vessels lifts the coffee and gravel up toward the top of the vessel A, and this movement allows the gravel, dirt, &c., of greater specific gravity than the coffee to settle below the coffee; and this movement rapidly repeated some half a dozen or more times will cause all the dirt, stone, &c., to be washed from the coffee and settle down into the vessel B, or pass off through the side openings in the vessels A and B.

The smaller vessel B, thus filled with the gravel, dirt, &c., is now lifted by its handle $b$ or other suitable means from the vessel A, and thrown one side; and the coffee is then cleaned of its dust, dirt, gravel, &c., and is drawn with the vessel A from the tub C. The coffee thus cleaned is removed from the vessel A and dried. The vessels A and B are then put together, and the same operation is repeated.

The larger vessel or sieve A could be used alone, and when the gravel, &c., had been precipitated the coffee could be raked or otherwise removed from the vessel A; or various devices might be designed by which the function performed by the smaller vessel B could be done; but as it is so simple and efficient I prefer to use it.

Having thus fully described my invention,

What I claim as new, and desire to secure by Letters Patent, is—

1. The combination of the vessels or sieves A and B, when used with water, substantially in the manner and for the purposes set forth.

2. The within-described process for cleaning coffee by the use of the apparatus above claimed, and in the manner herein described.

In testimony that I claim the above-described certain new and useful "improvements in apparatus for cleaning coffee, grain, &c.," I have hereunto signed my name this 30th day of March, 1871.

JOSEE JOHNSON.

Witnesses:
V. C. CLAYTON,
T. G. CLAYTON.